April 14, 1970   J. E. COLBY   3,505,825
SYSTEM FOR REPLACING DETERIORATED WOOD PILING
Filed Sept. 5, 1968   5 Sheets-Sheet 1

JAMES E. COLBY
INVENTOR.

BY *[signature]*

ATTORNEYS

JAMES E. COLBY
INVENTOR.

BY
ATTORNEYS

April 14, 1970  J. E. COLBY  3,505,825
SYSTEM FOR REPLACING DETERIORATED WOOD PILING
Filed Sept. 5, 1968  5 Sheets-Sheet 4

JAMES E. COLBY
INVENTOR.

BY
ATTORNEYS

April 14, 1970   J. E. COLBY   3,505,825

SYSTEM FOR REPLACING DETERIORATED WOOD PILING

Filed Sept. 5, 1968   5 Sheets-Sheet 5

JAMES E. COLBY
INVENTOR.

BY *Seed, Berry & Dowrey*

ATTORNEYS

United States Patent Office 3,505,825
Patented Apr. 14, 1970

3,505,825
SYSTEM FOR REPLACING DETERIORATED WOOD PILING
James E. Colby, Rte. 5, Box 1069,
Bremerton, Wash. 98310
Continuation-in-part of application Ser. No. 662,946, Aug. 24, 1967. This application Sept. 5, 1968, Ser. No. 757,708
Int. Cl. E02d 5/38, 5/64
U.S. Cl. 61—54
13 Claims

ABSTRACT OF THE DISCLOSURE

Wood piling deteriorated by contact with water and air or by sea life can be replaced with an encased concrete piling extending from just below the mudline to the underside of the load-bearing cap of an overhead structure. The deteriorated piling is severed below the mudline and a tubular concrete form positioned between the stub head and the overhead cap. Concrete is then transferred in a continuous pour from the bottom up until the tubular form is filled. The tubular form may be designed as a permanent component of the replacement piling so as to protect the concrete from its environment.

---

This application is a continuation-in-part of my co-pending application, Ser. No. 662,946, filed Aug. 24, 1967, and now abandonded.

Wood piling subject to exposure to water either continuously or periodically at high tides conditions, as used to support docks, piers, trestles, and other structures supported in or over waterways, are subject to continuous deterioration. This deterioration may be due, for example, to rot caused by the alternating contact with water and air on a section of the piling, and—in salt water—due to the shipworm or toredo that bores and honeycombs the piling. Whatever the cause of this deterioration, the piling section driven into the ground is usually sound from a point just below the mudline. At the present time, one of two methods are generally employed to replace those pilings that are so deteriorated that they can no longer provide adequate support.

One method is to pull the entire piling and replace it with another wood piling. This procedure, however, is complicated and expensive. First the superstructure above the piling must be opened up to expose the piling. This involves—at the minimum—removal of surfacing, decking and load-bearing timbers, in the case of a dock. Equipment must be positioned for removal of the piling and for driving a replacement piling. Scaffolding must be erected to cut the new piling to the proper height. Then the new piling must be maneuvered into proper load-bearing position and the previously-removed superstructure replaced. Another method is to cut off the deteriorated piling just below the mudline, leaving a sound, driven stub, set a new wood piling on the stub, and attach the new piling to the overhead superstructure. Both of these merely replace deteriorated wood piling with a new wood piling subject to the same deteriorating effects as the replaced piling. Under some water conditions, this replacement cycle is less than ten years and is seldom as long as twenty years.

The primary object of this invention is to provide a system wherein deteriorated piling is cut away just below the mudline and the sound section of the piling below the mudline employed as a stub for the in-place erection of a concrete replacement piling. Another object is to provide a similar system for erecting original piling wherein a load-bearing stub is driven below the mudline and employed as a stub for the in-place erection of a concrete piling. A further object is to provide apparatus for such systems that can be assembled and handled, both in terms of installation and removal, in a manner that makes the system economical and commercial, as opposed to a laboratory curiosity; still another object of this invention is to provide a concrete replacement pile structure of unique design by in-place casting. These and other objects and advantages will become apparent from a consideration of the following description and the accompanying drawings, of which:

In brief, the method of this invention, as pertains to the replacing of a deteriorated piling, comprises severing the deteriorated piling section to leave a sound piling stub to build upon, providing an elongated concrete form structure and placing such structure on the sound piling stub, securing the form structure to the overhead superstructure to which the deteriorated piling had been connected, and casting a concrete column in place within the form structure by pumping concrete into the bottom of the form structure until the pumped concrete rises into abutment with the area of attachment of the form structure with the overhead superstructure. In the case of a deteriorated wood piling, a sound piling stub will generally be obtained only by severing the piling below the mudline. In the case of deteriorated metal or concrete piling, a sound piling stub may well be obtained without excavating below the mudline. In either case, the piling section above this lower cut will usually be completely removed up to the overhead superstructure (which is usually a load-supporting beam) although circumstances may well dictate leaving an upper piling stub end and, therefore, the terms "overhead superstructure" and "overhead member" are employed to include this possibility. The form structure is assembled prior to being positioned on the piling stub and a form extension is employed to engage both the top of the form and the overhead superstructure to laterally position the form relative to the overhead superstructure and to also provide a concrete vent opening above the underside of the overhead superstructure.

Because the original piling to be replaced is seldom driven perfectly vertical, the replacement piling form—which typically will be laterally positioned relative to the overhead superstructure along the same line as the original piling—will not be aligned at right angles to overhead cross beam. Consequently, the provision of a concrete vent above the base of the overhead superstructure will ensure that the top of the cast-in-place concrete column will be in firm, flush load bearing contact with the base of the overhead superstructure.

The concrete form structure depicted comprises an elongated form tube of a thickness, cross-section area and length required for each piling replacement, a releasable bottom jacket is secured to the lower end section of the form tube, and a releasable top jacket is secured to the upper end section of the form tube. The bottom jacket mounts a concrete inlet for attachment to a concrete pumping hose and is designed to encase the lower end of the form tube for transferring concrete through the form tube wall into the lower end of the form tube. The bottom jacket also is designed to stabilize the lower end of the form tube relative to a form keeper mounted by the top of the pile stub and therefore has a closed inner periphery that closely matches the outer periphery of the form tube. The top jacket is designed to be secured to the overhead superstructure and to encase the upper end of the form tube to laterally stabilize the form tube relative to the overhead superstructure. The top jacket also serves as an extension of the form tube and is adapted to be shifted axially upward into engagement with the overhead superstructure after the base of the form tube has been positioned on the form keeper. Therefore, the top jacket has a lower structure that provides a closed inner periphery that closely matches the outer periphery of the form tube and an upper structure that attaches to the overhead superstructure and that provides a transition from the end of the form tube to the overhead superstructure in such a manner that the cast-in-place concrete column will firmly seat against the base of the overhead superstructure regardless of the attitude or inclination of the base surface.

The components of this system—the form keeper, the top and bottom jackets, and the form tube—must be so structured that the assembled form structure can, before being placed in position, be fitted interiorly with a re-steel cage of concrete reinforcing rods that will extend from the form keeper up to close adjacency to the overhead superstructure. These components must also be so structured that the entire assembly can be placed in position and anchored, top and bottom, in an accurate, positive and rapid manner without damage to the form tube. This latter feature is especially important when a non-metallic form tube is employed.

Figure 1:
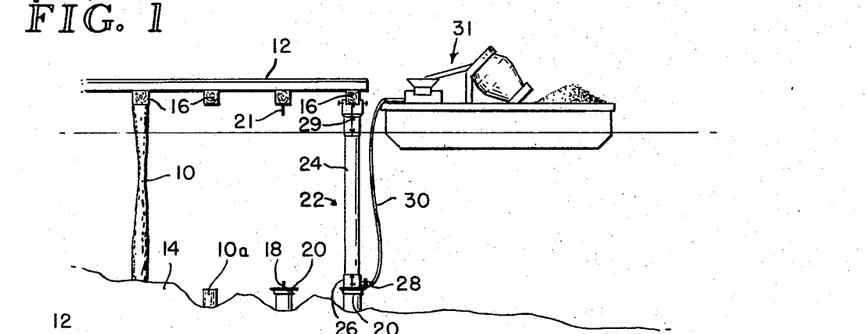
FIG. 1 depicts in sequence the replacement of deteriorated sections of piling beneath a pier structure.

Referring now to FIG. 1, a deteriorated piling 10 is shown as it might appear after underwater damage due to toredos, and the like. To replace the piling without damage to the pier 12 or disruption of the service provided by the pier, in accordance with this invention the bottom 14 is excavated around the piling so that the piling can be severed just below the mudline, leaving the overhead cross beam or cap 16 by which the piling was joined to the pier 12 and the driven stub 10a. A drift pin 18 is then driven into the exposed upper end or head of the remaining stub and a form retainer 20 is inserted over the drift pin onto the stub. Another drift pin 21 is driven into the overhead cap 16 if such a pin was not left upon removal of the deteriorated piling section. A tubular concrete form structure 22 is positioned over the stub such that it extends from the form retainer 20 to the overhead cap 16. The concrete form structure 22 comprises a releaseable bottom form jacket 26 applied to the lower end of a tubular concrete form tube 24 and clamped into position such that a concrete inlet 28 is placed in communication with the interior of the tubular form 24 just above the retainer 20, and a releaseable top form jacket 29 applied to the upper end of the tubular form tube 24. The bottom jacket is tightened to clamp the bottom end of the tube to the form keeper 20, and the top jacket 29 is attached to the cap 16. A concrete transfer line 30 leading from a concrete pumping source 31 (shown located on a barge but which may be located on the pier 12) is then attached to the inlet 28. Concrete may then be transferred into the tubular form structure 22 from the bottom up until the form structure 22 is completely filled. Water entrapped by the form structure during installation will thus be forced upward out of the form as the concrete rises therein.

Figure 2:
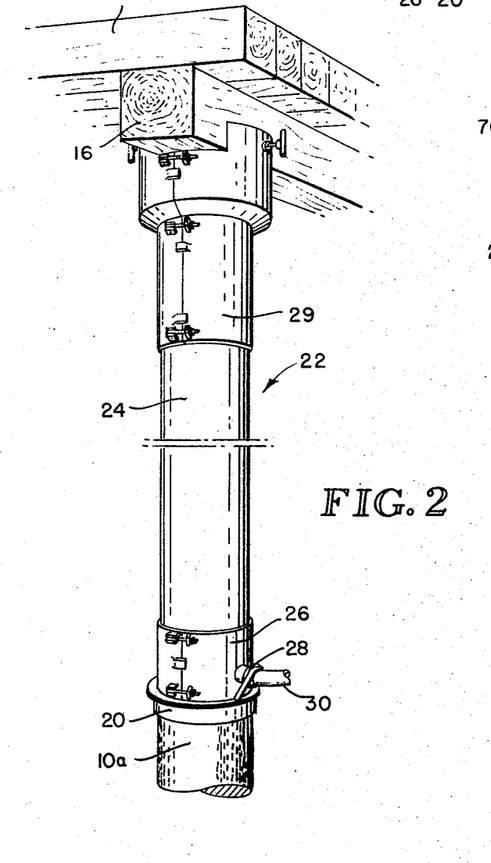
FIG. 2 depicts in perspective an assembled form structure in place for casting the concrete replacement pile of this invention.
Figures 4, 5, 6:
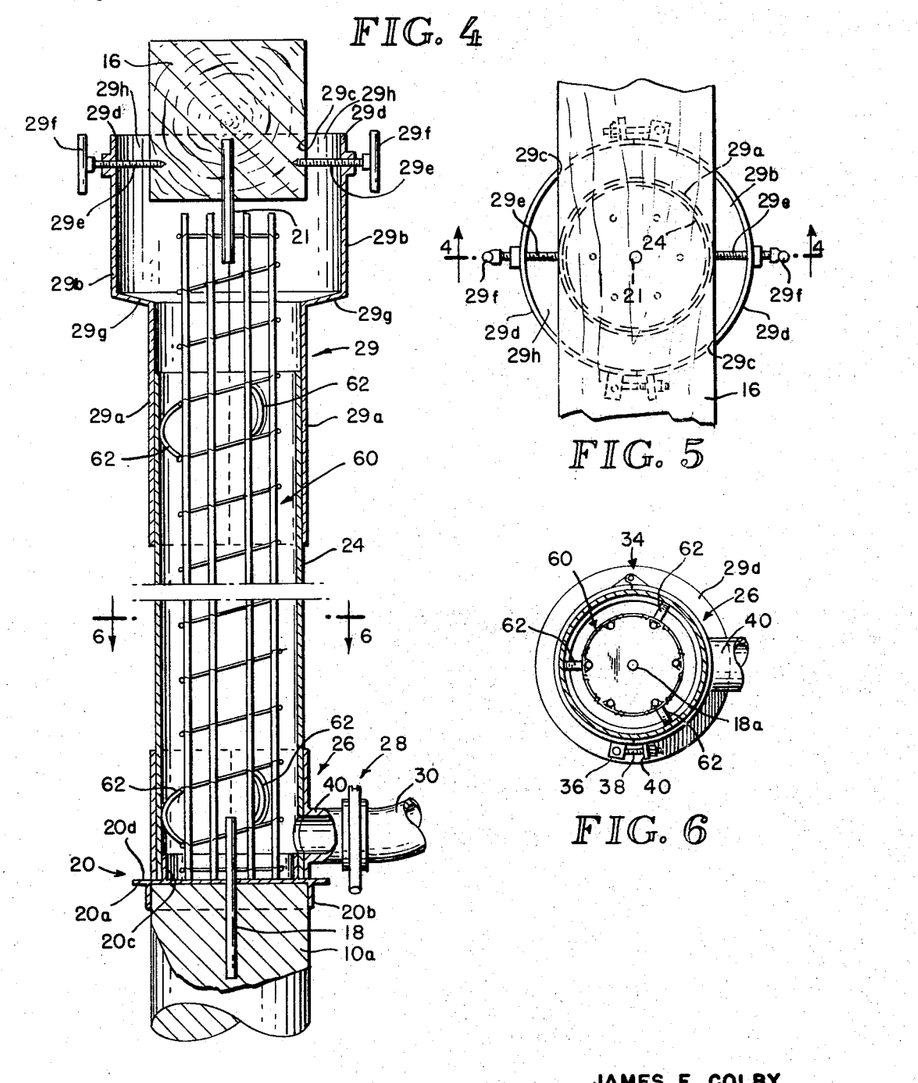
FIG. 4 depicts in vertical cross section the FIG. 2 form structure in place for casting the concrete replacement pile of this invention.
FIG. 5 depicts the FIG. 2 form structure as viewed in plan at a pier cross beam elevation.
FIG. 6 is a cross section detail taken along the line 6—6 in FIG. 4.
Figure 7:
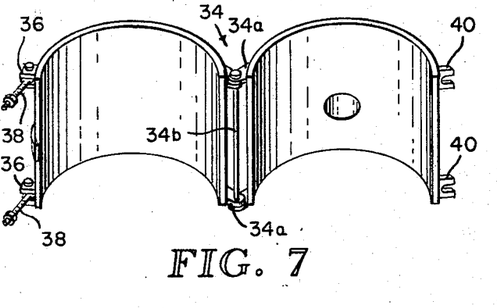
FIGS. 7–8 are detail views of the bottom form jacket of the FIG. 2 form structure.
Figure 8:
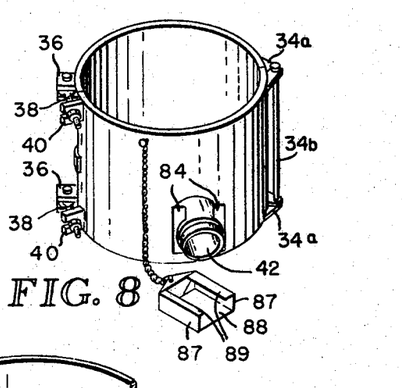

Referring now to FIGS. 2 and 4 it is seen that the form retainer 20 comprises a horizontal plate 20a, typically circular in plan, that rests on top of the pile stub 10a, a bottom short cylindrical ring or rim 20b that may be provided to encircle the upper end periphery of the pile stub and with an inner diameter that fairly closely approximates the outer diameter of the pile stub, and a top short cylindrical ring or rim 20c that is encircled by the lower end of the form tube 24 when the form structure 22 is placed in position and that has an outer diameter that quite closely approximates the inner diameter of the form tube. The plate 20a is sufficiently wide that an annular rim 20d is provided outside the rim 20c to support the form tube 24 and the bottom jacket 26. The plate 20a is bored to enable the form keeper to be inserted over the drift pin 18. The drift pin 18 and the bottom rim 20b serve to center the form keeper on the pile stub head. The top rim 20c serves as a concrete seal to prevent escape of concrete pumped into the form structure and as such it is closely fitted to the form tube. Because the primary functions of the retainer are to provide a concrete seal and to enable the form tube to be rapidly and easily positioned atop the pile stub, the form retainer thickness will typically be less than the thickness of either the form tube or the jackets.

Referring now to FIGS. 2, 4 and 7–8, the bottom jacket 26 is provided in two semi-cylindrical sections hinged together longitudinally by hinge 34. The hinge 34 comprises upper and lower pairs of overlapping tabs 34a, one tab of each pair being mounted by each section, and a hinge bolt 34b extending through the overlapping tab pairs. One section contains two pairs of tabs 36, each pair having a hatch bolt 38 pivotally mounted therein such that the hatch bolts can be swung into locking engagement with cooperating tabs 40 carried by the other section. Nuts on the hatch bolts may be tightened to close the jacket about the form tube or loosened to release the jacket from the form tube. One of the sections is ported and fitted with an outwardly-extending sleeve 42 for attachment to a concrete pumping hose. The jacket section port is positioned at an elevation sufficient to clear the keeper rim 20b when the form structure is placed in position on the form keeper. Other hinge and latching means could be substituted for those depicted, however the means depicted are most convenient to handle and operate underwater and are so designed that none of their component parts are likely to be dislodged and lost during assembly or disassembly of the jacket. Any substitution for these components must take such considerations into account.

As seen in FIGS. 2, 4, 5 and 10–11, the top jacket 29 is provided in two semi-cylindrical sections connectable together longitudinally along two joints. Each section comprises a lower semi-cylindrical portion 29a which when joined to the corresponding portion of the other section, has an inner periphery closely matching the outer periphery of the form tube. Each section also comprises an upper semi-cylindrical portion 29b which, when joined to the corresponding portion of the other section provides an inner periphery substantially larger than the outer periphery of the form tube. The upper portions 29b are cut away such that, when connected, two diametrically opposite rectangular notches 29c—29c are provided, each notch being centered over one of the jacket joints, between the edges of two diametrically opposite arcuate wall portions 29d—29d. Each of these arcuate wall portions is provided with a threaded boss through which pointed-end beam locking bolts 29e—29e are screwed. Each bolt is provided with a lever handle 29f—29f to facilitate rapid manual adjustment. Each section also comprises an intermediate semi-circular and frusto-conical transition portion 29g—29g joining the upper and lower portions.

The top jacket section lower portions along each joint are provided with two pairs of tabs 50, each pair having a hatch bolt 52 pivotally mounted therein such that the hatch bolts can be swung into locking engagement with cooperating tabs 54 carried by the corresponding other section. The jacket section upper portions along each joint are provided with a pair of tabs 50 having a hatch bolt 52 pivotally mounted therein such that the hatch bolt can be swung into locking engagement with cooperating tabs 64 carried by the corresponding other section. Nuts on the lower portion hatch bolts may be tightened to close the jacket about the form tube or loosened to release the jacket from the form tube. Due to the existence of the varying diameters of the top jacket, the jacket sections are not hinged together, although it would be possible to hinge the upper portions together along one joint.

As shown in FIGS. 2, 4 and 5, the lower portions of the top jacket confine the upper end of the form tube, with the upper end of the form tube being below the transition portion. The upper portions of the top jacket enclose the lower half of a cross beam 16 of the overhead superstructure, the cross beam extending through the notches 29c—29c and the jacket being secured thereto by bolts 29e—29e screwed into the sides of the beam. When thus secured, the arcuate walls 29d—29d extend above the bottom of the beam 16 and define with the beam sector-shaped vents 29h—29h on either side of the beam which open upward above the beam bottom or base. Inasmuch as the cross beam typically will be of a width at least at great as the original piling diameter, the upper section of the top jacket must be larger than the lower section to enable the concrete to encase the sides of the beam.

As seen in FIG. 4, an installed form structure will typically include a re-steel cage 60 comprising a plurality of re-steel rods interconnected by a spiral of wire to which the rods are tied. The cage is centered in the form tube by spacers 62 connected to the cage and spanning the width between the cage and the form tube. The re-steel cage extends from the keeper plate 20a to just below the bottom of beam 16, typically within 3″–4″ of the beam bottom. If desired the keeper plate 20a may be provided with a re-steel rim similar to the rim 20c but of smaller diameter to facilitate centering the base of the re-steel cage.

Figure 3:
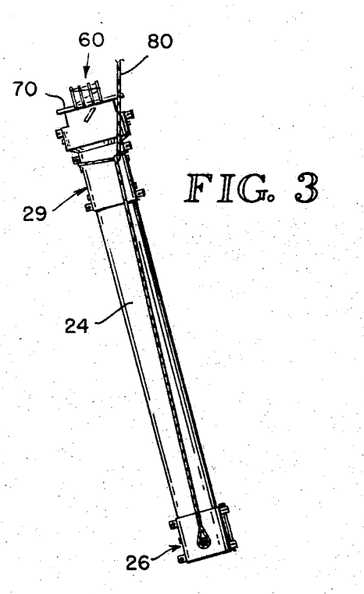
FIG. 3 depicts in vertical elevation a means for suspendingly placing the FIG. 2 form structure into position.

To install a form structure, including a re-steel cage, the bottom jacket will be fitted over a form tube, that has been cut to the required length, and tightened thereon "finger tight" with the base of the jacket flush with the base of the tube. If a hole has not been provided in the tube for registry with the inlet sleeve 42, such a hole will be cut or punched. The top jacket is fitted over the upper end of the form tube, with the top of the top jacket approximately even with the top of the form tube, and tightened thereon "finger tight." If the re-steel cage has not previously been inserted into the form tube, it is so inserted with the cage base flush with the tube base. A bar 70 (see FIG. 3) is inserted between the windings of the cage wire spiral and across the top jacket such that the cage will be suspended on the bar when the form structure is placed in position. The form structure is then rigged as shown in FIG. 3 with a lowering cable 80 wrapped around the top jacket, below the transition portions, over itself and down to the bottom jacket where it is looped around the inlet sleeve 42. The cable length between the sleeve 42 and the upper jacket transition portions is such that the bottom packet will not slip off as the form structure is lowered. Of course, the FIG. 3 rigging is not the only suitable one, but it is simple and efficient and is easy to remove after the form structure is positioned.

When the base of the form structure is positioned on a form keeper and vertically aligned, the bar 70 is removed. The top jacket hatch bolt nuts are then loosened and the top jacket is shifted axially upward to engage the overhead cross beam and then secured to the beam and secured to the form tube. The bottom jacket is secured to the tube and a concrete pumping hose is attached to the sleeve 42. In the usual case, the operations to be performed at the base and at the top of the form structure during installation will take place at the same time. The completed installation appears in FIG. 4.

As concrete is pumped into the form structure, any water in the form tube will be forced up and out through the top jacket vents. When the concrete reaches the beam bottom, it will also be forced up around the beam and out through the top jacket vent. When the concrete reaches the vent opening, concrete pumping would be stopped. The structure of the top jacket vent and the elevation of its opening relative to the beam bottom are important features of the top jacket design illustrated. Firstly, the vents are sufficiently large that they offer no appreciable restriction that would unduly cause a build-up in concrete pressure. Since the force exerted at the form structure base can be several hundred pounds under normal operating conditions, the importance of not unduly building this pressure cannot be overemphasized. Secondly, the vent outlets being above the beam bottom insures that the concrete will be in firm load bearing contact with a substantial area of the beam bottom. After pumping, the fluid concrete column will usually settle somewhat, and the excess concrete within the vents will ensure that the cured concrete column will remain in firm load supporting contact with the beam bottom. The static head of concrete in the vents will also improve the density of the concrete adjacent to the beam bottom.

Figure 9:
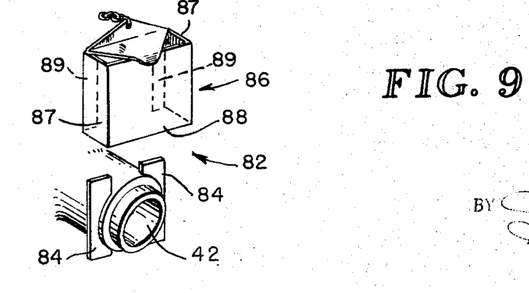
FIG. 9 is a detail view of the bottom jacket concrete inlet shut-off gate.
Figure 10:
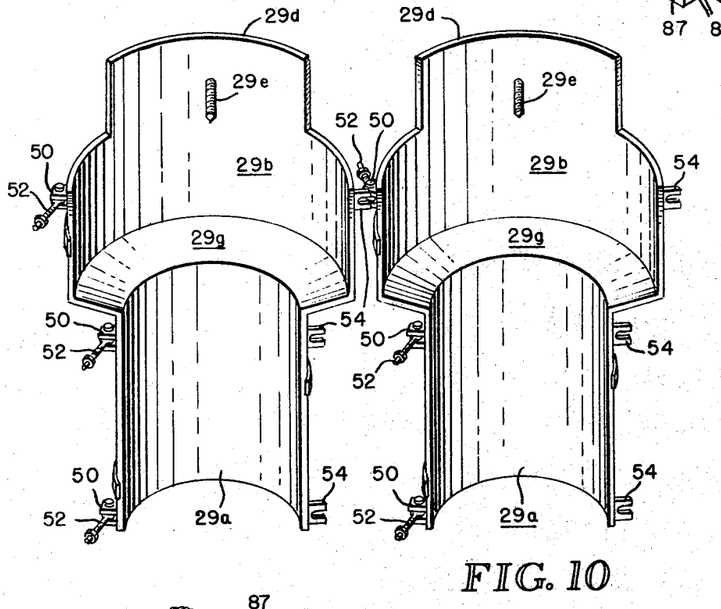
FIGS. 10–11 are detail views of the top form jacket of the FIG. 2 form structure.

The preferred bottom jacket concrete shutoff 82 comprises a guide bracket 84 upstanding from the bottom jacket sleeve 42, and a cutoff-gate 86. The gate 86 comprises side walls 87 adapted to engage and be guided by the vertical edges of the guide bracket 84, a front wall 88 adapted to close off the opening to the sleeve 42, and top grip 89. When concrete transfer is terminated, the gate 86 is attached to the guide bracket 84 and manually forced downward to seal off the sleeve opening simultaneously with the removal of the transfer hose 30 from the sleeve 42.

Figures 11, 12, 13:
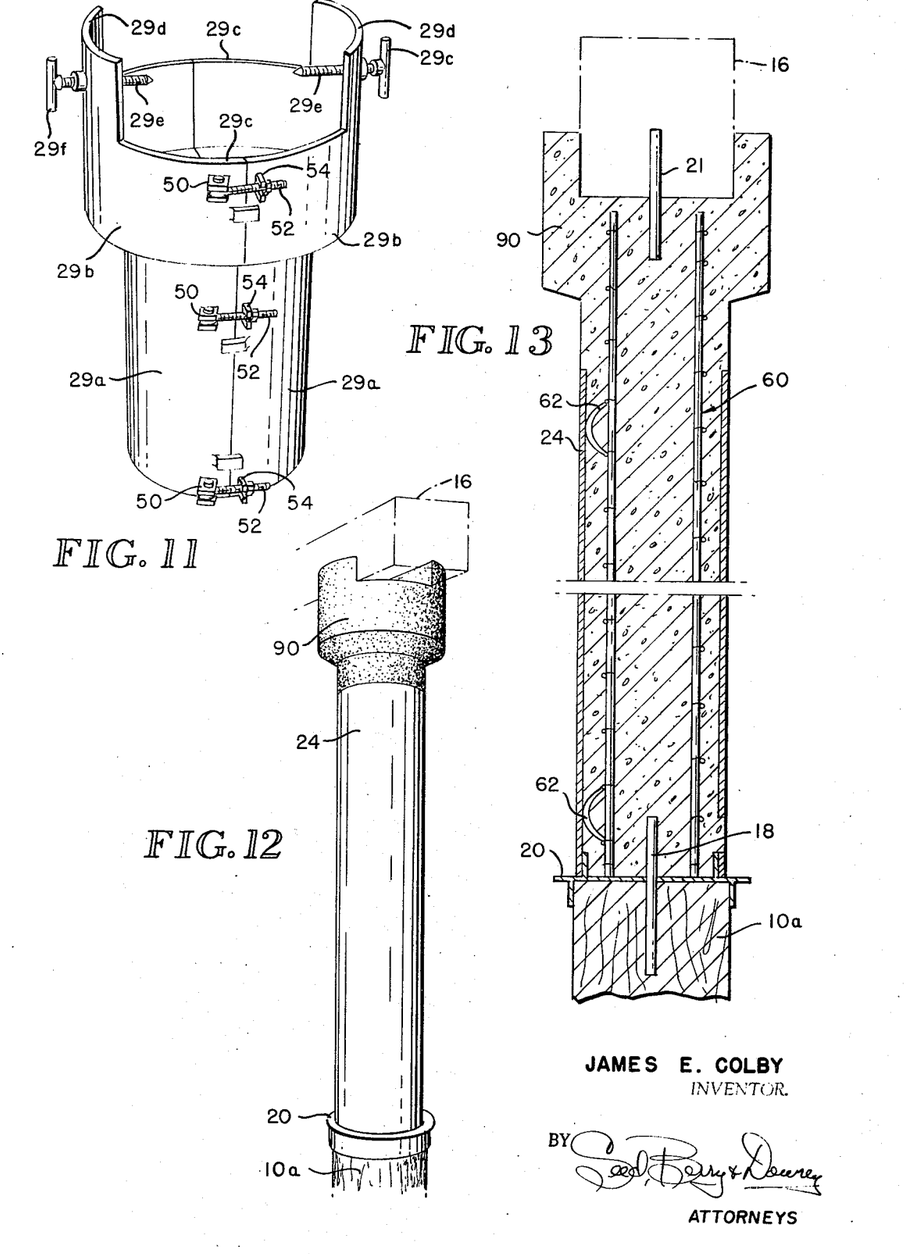
FIGS. 12–13 are detail views of the finished concrete replacement piling as cast-in-place by the system of this invention.

The completed, reinforced concrete column is shown in FIGS. 12 and 13 as it would appear after removal of the top and bottom jackets. The overhead beam is firmly seated in the enlarged head of the concrete column 90. The upper column wall is flush with the outer surface of the form tube that sheaths the lower portions of the column.

As can be seen, the vertical adjustability of the top jacket permits the positive seating of the form structure onto the form keeper. Positively seating the structure on the keeper greatly reduces the stresses experienced by both jackets, such that the jackets can be fabricated with thinner wall sections and thus can be more easily handled. Positive seating on the keeper also greatly simplifies securing the upper end of the form structure to the overhead superstructure. During and after installation of the form structure, the bottom jacket, form tube, and re-steel cage typically can be axially rotated relative to one another as required even after the bottom jacket has been tightened to the final degree required. Were it not for this adjustability of the top jacket, it would be quite difficult and time consuming to properly position the upper end of the form structure and the other components of the form structure. It would, for example, necessitate having to slip the bottom end over the keeper, and then raise the entire structure into abutment with the overhead beam with one or both jackets being required to support the weight of the form tube structure.

Should the length of the tubular form 24 so dictate, one or more intermediate jackets may be applied to the tubular form intermediate its ends. In such an arrangement, the intermediate jacket would be provided with an inlet so that water would be forced out through the inlet until the concrete level reached that elevation. Concrete transfer through the next lower inlet would then be terminated and continued through the intermediate jacket inlets seriatim until the form is completely filled.

A preferred form tube consists of laminated paper helically wound and impregnated with bitumen, such as vacuum-impregnated coal tar pitch. This tube is water impervious and light weight. In the typical case, the form tube will be left on the cured concrete column to provide a superior column that is practically impervious to corrosion and erosion. This tube, however, can be cracked by overtightening the jackets therearound. By providing a form keeper of the type described agove, so designed that the bottom jacket can be tightened against the form keeper rim, the likelihood of overtightening is greatly reduced to the extent that the exercise of ordinary care will prevent its occurrence. The top jacket is not subjected to the forces and stresses experienced by the bottom jacket, and therefore the top jacket usually need not be tightened to the same degree as the bottom jacket. Hence, overtightening of the top jacket is not as likely to occur. Due to the static head of the concrete column, the preferred form tube will expand and consequently the bottom jacket serves an additional function in maintaining the structural integrity of the bottom end of the form tube.

Wood piling are typically driven to a bearing of about 20 tons and the sound piling stub remaining after removal of the deteriorated piling section will still be capable of bearing a 20 ton loading. Therefore, the reinforced concrete replacement column of this invention should be designed to match the bearing of the piling stub. For example, a 12 inch diameter reinforced concrete column will have a bearing of 20 tons plus up to 28 feet. Above 28 feet, the column should be 13 or 14 inches in diameter. In practicing the present invention, form tube inner diameters of 12 inches and 14 inches should be sufficient to meet the greater portion of the bearing requirements and column lengths to be encountered. Therefore, top and bottom jacket sets would be provided to accommodate 12 inch ID form tubes and 14 inch ID form tubes for maximum versatility.

Because of the design of the form retainer, the diameter of the piling stub does not affect the size requirements of either the form tube or the jackets. The circular retainer plate and cylindrical form tube rim will be fabricated to accommodate a 12 inch or a 14 inch ID form tube and the corresponding bottom jacket regardless of the piling stub diameter. Consequently, although each concrete replacement column will be "tailor made" for each piling in the sense of its length and load bearing capacity, the re-useable jackets and form keepers need not be so "tailor made."

The form retainer embodiments now to be described may be suitable alternatives to the preferred embodiment. These embodiments, however, have one or both of two deficiencies. They may not offer sufficient form tube-backing to prevent overtightening of the bottom jacket and they may not offer adequately positive seating for the base of the form structure.

Figure 14:
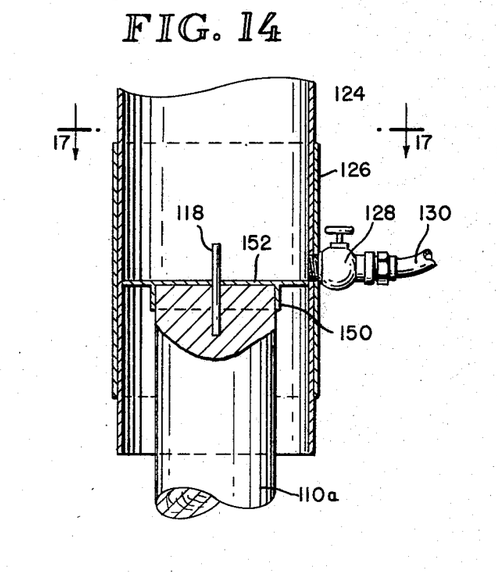
FIGS. 14–17 are detail views of alternative form retainer embodiments.

One form retainer embodiment as shown in FIG. 14 comprises an iron or steel ring 150 formed so as to enclose the head of a stub 110a, and a circular iron or steel disk 152 welded to the upper end of the ring 150. The disk is axially bored so that the retainer can be slipped over the drift pin 118 down onto the stub as shown.

Figure 15:
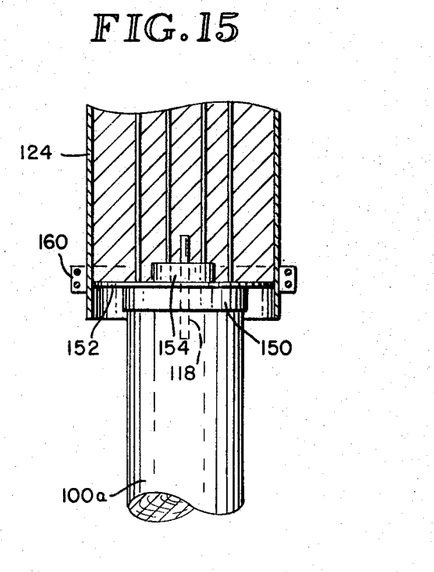

The FIG. 15 embodiment of the retainer is similar to the FIG. 14 embodiment with an upstanding re-steel ring 154 welded to the upper side of the disk 152. This re-steel ring facilitates the placement and spacing of reinforcing re-steel rods within the tubular form.

Figure 16:
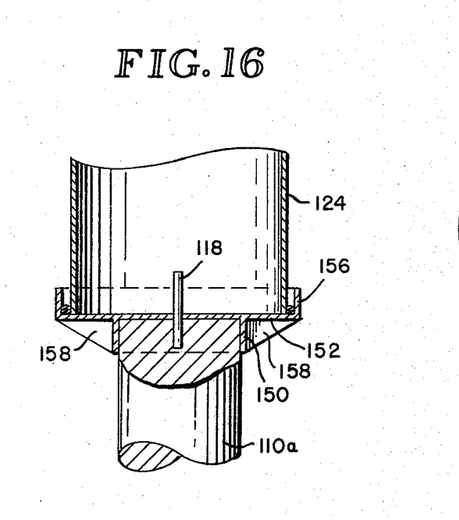

The FIG. 16 embodiment of the retainer is also similar to the FIG. 14 embodiment with an upstanding form ring 156 welded to the edge of the disk 152 and with reinforcing gussets welded to the depending stub ring 150 and to the underside of the disk 152. This embodiment would be employed where the required diameter of the concrete piling is substantially larger than the diameter of the stub on which the concrete piling is mounted.

In the FIGS. 14 and 15 embodiments, the form structure usually would be positioned over the retainer and then lifted into engagement with the overhead cap and secured thereto. In the FIG. 16 embodiment, the form structure usually would be positioned around the overhead cap and then lowered into position on the retainer. In some instances when employing retainers of the FIGS. 14–15, the tubular form can be supported by the bottom of the excavation around the stub head. In other instances when employing retainers of the FIGS. 14–15 type, the tubular form will be supported above the excavated bottom in which case it may be desirable to clamp the tubular form to the disk 152. FIG. 15 depicts an adjustable metal band clamp 160 adapted for the purpose, the lower valved clamp or jacket assembly being placed above the band clamp in this instance rather than as shown in FIG. 14. When the tubular form slips over the disk, the inner diameter of the form is preferably only slightly larger than the disk diameter so as to minimize concrete leakage during concrete transfer into the form.

Figure 17:
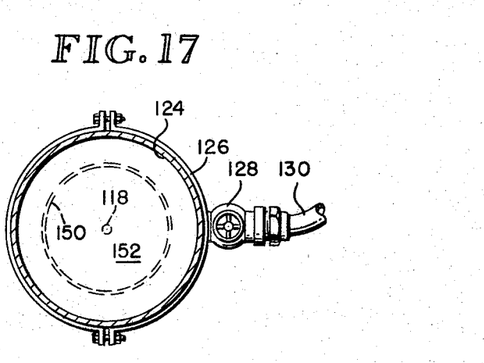

FIGS. 14 and 17 depict the bottom jacket as a hinged jacket comprising two semi-cylindrical sections adapted to be bolted together with drawbolts to encase the tubular form, and provided with a concrete transfer valve 128.

In the preferred form of the invention, the tubular form is intended as a permanent component of the completed replacement piling. As such, it may be fabricated from metal, plastic, fiberglass, or like material. Non-metallic materials would be preferred for use in sea water to eliminate corrosion that might deteriously affect a metallic form. By providing the tubular form as a permanent component, the surface of the concrete piling would be shielded from the corrosive effects of the surrounding environment. If such protection is not required, the tubular form may be fabricated from a material that will retain its structural integrity only long enough for the freshly poured concrete to set up. Suitable material for this purpose would be heavy paper or fiberboard, or the like.

If, due to wind or water motion, the tubular form has insufficient rigidity prior to being filled with concrete, suitable reinforcing and bracing must be provided. One suitable means would be to encase the form tube, between the top and bottom jackets, with thin-walled metal jackets or bands that could be removed after the concrete has set up. When such reinforcing is required, the removable jackets could be assembled around the form prior to its installation on the piling stub. If more reinforcing is required, the jackets could be provided with rigging eyes or the like so that the jacketed form could be guyed to adjacent piling, etc.

A typical installation in accordance with this invention might proceed as follows:

The piling to be replaced would be removed by severing just below the mudline and by disconnecting its upper end from the overhead cap to the supported superstructure. If low water tide conditions would expose the mudline, it would be preferable to remove the piling at that time. Otherwise, the mudline severing would have to be performed by a hard hat, or deep sea, diver. After removal of the piling, a top circular section of the stub head is cut and sent to the top for determination of the soundness of wood and for measurement of its diameter. More than one cut may be necessary to determine just where deterioration of the piling had terminated. The top surface of the stub will be cut generally perpendicular to axis of the stub.

The diver then axially drills the stub head and drives a drift pin into the axial bore. A retainer is lowered to the diver who inserts it over the drift pin onto the stub head. A drift pin or the like is also affixed to the underside of the cap.

A tape measurement is made to determine the length of tubular form required to extend from the plate of the retainer to an elevation below the overhead cap. A tubular form is then cut to the required length. If the required length is substantial it may be desirable to provide the tubular form in two or more axially-telescoping sections. The necessary jackets are assembled on the tubular form at dockside, one such jacket at the lower end section of the form, others as required at positions intermediate the ends, and one at the upper end of the form. If reinforcing jackets are required, such will also be installed dockside prior to lowering the form into position. When the form structure is in position it will extend along the same line as the original piling section which the concrete column will replace.

The system described above can also be employed to provide new piling structures by initially driving a piling stub so that the stub head is just below the mudline. The remaining assembly of the piling structure would proceed in a manner similar to that described above.

When removable top and bottom jackets are employed, the jackets will be removed after the concrete column has set up. It may be desirable, however, to provide these jackets as permanent elements of the cast-in-place column so that additional time need not be taken to remove the jackets. The bottom jacket, particularly, is susceptible of being fabricated sufficiently inexpensively to justify providing it as a permanent element, as could be the case if it were fabricated from plastic or plastic-like materials. The top jacket however, because of its rather more complicated configuration, may not be readily fabricated from plastic or other material sufficiently inexpensively to warrant its provision as a permanent element. In this regard, it must be kept in mind that under high tide conditions, driftwood may be hammered against the form tube by wave action and thereby impose substantial lateral forces on the top jacket before the concrete column is cast. Therefore, any inexpensive top jacket structure must be designed with sufficient wall thickness to withstand such lateral forces. The form retainer could also be fabricated from plastic or plastic-like materials to provide an inexpensive element.

When the method of this invention is employed to replace steel or concrete piling, the deteriorated section may have sufficient strength to substitute for a resteel cage. Or possibly, in the case of a steel piling, welding resteel rods to the deteriorated section would suffice. In such cases, the deteriorated section would not be severed, but rather the form tube would be provided in two semi-cylindrical sections which would be encased around the deteriorated section and strapped or bonded tightly together. The upper end of the form tube would typically be laterally stabilized by a top jacket secured to an overhead load bearing cap. Although under some conditions the top jacket might be secured to a sound upper section of the left-in-place piling. Using the preferred bituminized form tube as an example, the tube would be split lengthwise, each half positioned around half of the deteriorated section, and the two sections banded together by cylindrical bands 18 inches or so wide spaced axially apart every six feet or so. Also in such cases, the form retainer could be provided in two sections that together would encase the deteriorated section and joined thereto by welding or otherwise to provide a base on the sound piling bottom section for the cast-in-place concrete column.

It is believed that the invention will have been clearly understood from the foregoing detailed description of my now preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

The embodiments of the invention in which an exclusive property or privilege is claimed are defined as follows:

1. A method of providing a load bearing cast-in-place concrete column for a deteriorated piling having a sound lower section which comprises mounting a concrete form retainer on the sound lower section of the deteriorated piling; providing an elongated tubular concrete form having a concrete inlet port extending through the lower end of the form wall; positioning said concrete form longitudinally of the sound lower section and interfitted with said form retainer such that said form retainer provides a base supported by the sound lower section of a cast-in-place concrete column; providing a form extension at the upper end of said form which encircles said form and extends upwardly beyond the underside of an overhead member to provide a vent above both the top of the form and the level of the underside of the overhead member, and securing said form extension to the overhead member such that the upper end of said form is laterally stabilized to the overhead member; providing a pumping source of concrete including a transfer hose communicable with said concrete inlet port and pumping concrete through said transfer hose into said form to fill said form and its form extension from the bottom of the form up until concrete reaches said vent so that a resultant concrete column will be in firm load bearing compact with the underside of the overhead member.

2. The method of claim 1 wherein said form retainer is provided with a plate and with a form rim upstanding from said plate, the form rim having a diameter such that said form and form rim may be closely interfitted; and positioning said form on said plate with the form bottom section and form rim closely interfitting and with said inlet port beng positioned above said rim; and providing a bottom jacket seated on said plate and encased around the lower end section of said form, said bottom jacket having a concrete inlet communicable with said inlet port.

3. The method of claim 1 wherein said form extension is provided as a top jacket encased around the upper end section of said form, said top jacket having an upper portion of larger cross section than said form that contains said vent and is adapted to fit around the overhead member; and wherein said top jacket is initially positioned on said form below the overhead member when said form is positioned into engagement with said form retainer and then shifted upwardly into engagement with the overhead member and secured thereto to laterally stabilize the upper end of said form.

4. A method of replacing a deteriorated piling with a load bearing cast-in-place concrete column which comprises severing and removing the deteriorated section of a piling so as to leave a sound bottom piling stub and an overhead member to the underside of which the deteriorated section had been in load bearing contact; capping said piling stub with a concrete form retainer; providing an elongated concrete form tube, a tubular bottom jacket having a concrete inlet in the wall thereof, and a tubular top jacket having an enlarged upper section; assembling a concrete form structure by encasing the lower end of said form tube with said bottom jacket such that said concrete inlet is communicable with the interior of said form tube and encasing the upper end of said form tube with said top jacket; positioning said concrete form structure between said piling stub and the overhead member with the lower end of said form tube in contact with said form retainer such that said form retainer provides a base supported by said piling stub for a cast-in-place concrete column; shifting said top jacket upwardly relative to said form tube to bring the enlarged upper end section of said top jacket into engagement with the overhead member such that a concrete vent is provided above the underside of the overhead member; securing said top jacket to the overhead member to laterally stabilize said form tube relative to the overhead member; providing a pumping source of concrete including a transfer hose communicable with said bottom jacket concrete inlet; and pumping concrete through said transfer hose into said form tube to fill said form structure from the bottom of the form tube up until concrete reaches the elevation of said vent so that the resultant concrete column will be in firm load bearing contact with the underside of the overhead member.

5. The method of claim 4 wherein said top and bottom jackets are releasably clamped around said form tube; and wherein said top and bottom jackets are released from said form tube and removed for re-use when said concrete column has set up.

6. A method of replacing a deteriorated piling with a load bearing cast-in-place concrete column which comprises severing and removing the deteriorated section of a piling so as to leave a sound bottom piling stub and an overhead member to the underside of which the deteriorated section had been in load bearing contact; capping said piling stub with a concrete form retainer comprising a flat plate with a form rim upstanding from said plate; providing an elongated tubular concrete form consisting of a non-metallic form tube fabricated of bitumen impregnated and laminated fiber and having an inner periphery closely matching the outer periphery of said form retainer rim and having a concrete inlet port extending through the lower end of said form tube; positioning said form tube over said form retainer rim and on said form retainer plate such that said rim provides a bottom concrete seal for said form tube and such that said plate provides a base for a cast-in-place concrete column; providing a bottom jacket encased around said form tube and seated on said form retainer plate, said jacket having an inner periphery closely matching the outer periphery of said form tube such that expansion of the bottom end of said form tube away from said form retainer rim due to the static head of concrete contained by said form tube is prevented, said bottom jacket having a concrete inlet port; providing a pumping source of concrete including a transfer hose communicable with said bottom jacket concrete inlet; and pumping concrete through said transfer hose into said form tube to fill said form tube from the bottom up until concrete reaches the base of the overhead member.

7. The method of claim 6 including providing a form tube extension at the upper end of said form tube and securing said form tube extension of the overhead member such that the upper end of said form tube is laterally stabilized relative to the overhead member and such that a vent is provided from said form tube extension above both the top of the form tube and the level of the underside of the overhead member.

8. The method of claim 7 wherein said form extension is provided as a top jacket releasably encased around the upper end section of said form, said top jacket having an upper portion of larger cross section than said form that contains said vent and is adapted to fit around the overhead member; and wherein said top jacket is initially positioned on said form below the overhead member when said form is positioned into engagement with said form retainer and then shifted upwardly into engagement with the overhead member and secured thereto to laterally stabilize the upper end of said form.

9. The method of claim 7 wherein said top and bottom jackets are releasably clamped around said form tube; and wherein said top and bottom jackets are released from siad form tube and removed for re-use when said concrete column has set up.

10. A method for providing a load bearing cast-in-place concrete column for a deteriorated piling having a sound lower section which comprises securing a concrete form retainer to the sound lower section of the deteriorated piling; providing an elongated tubular concrete form having a concrete inlet port extending through the lower end of the form wall; positioning said concrete form longitudinally of the sound lower section and on said form retainer such that said form retainer provides a base supported by the sound lower section for a cast-in-place concrete column; providing a bottom jacket having a concrete inlet communicable with said inlet port and seating said bottom jacket on said form retainer such that said bottom jacket encases the lower end section of said form with said concrete inlet aligned with said inlet port; stabilizing the upper end section of said form; providing a pumping source of concrete including a transfer hose communicable with said bottom jacket concrete inlet and attaching said transfer hose to said concrete inlet; and pumping concrete through said transfer hose and said lower jacket into said form to fill said form from the bottom up into firm load bearing contact with the underside of an overhead member.

11. The method of claim 10 wherein said form retainer is provided with a plate and with a form rim upstanding from said plate, the form rim having a diameter such that said form and form rim may be closely interfitted; and positioning said form on said plate with the form bottom section and form rim closely interfitting and with said inlet port being positioned above said rim.

12. A method of replacing a deteriorated piling with a load bearing cast-in-place concrete column having a sound section which comprises securing a concrete form retainer to the sound lower section; providing an elongated concrete form tube, a tubular bottom jacket having a concrete inlet in the wall thereof, and a tubular top jacket having an enlarged upper section; assembling a concrete form structure by encasing the lower end of said form tube with said bottom jacket such that said concrete inlet is communicable with the interior of said form tube and encasing the upper end of said form tube with said top jacket; positioning said concrete form structure between said piling stub and the overhead member with the lower end of said form tube in contact with said form retainer such that said form retainer provides a base supported by said piling stub for a cast-in-place concrete column; shifting said top jacket upwardly relative to said form tube to bring the enlarged upper end section of said top jacket into engagement with the overhead member such that a concrete vent is provided above the underside of the overhead member; securing said top jacket to the overhead member to laterally stabilize said form tube relative to the overhead member; providing a pumping source of concrete including a transfer hose communicable with said bottom jacket concrete inlet; and pumping concrete through said transfer hose into said form tube to fill said form structure from the bottom of the form tube up until concrete reaches the elevation of said vent so that the resultant concrete column will be in firm load bearing contact with the underside of the overhead member.

13. The method of claim 12 wherein said top and bottom jackets are releasably clamped around said form tube; and wherein said top and bottom jackets are released from said form tube and removed for re-use when said concrete column has set up.

References Cited

UNITED STATES PATENTS

| | | | |
|---|---|---|---|
| 518,354 | 4/1894 | Polhamus | 61—54 |
| 969,136 | 8/1910 | Cranford | 61—53 |
| 1,447,407 | 3/1923 | Blumenthal | 61—54 X |
| 1,807,962 | 6/1931 | Cassiere | 61—54 |
| 3,188,816 | 6/1965 | Koch | 61—54 X |
| 3,338,058 | 8/1967 | Young | 61—54 |
| 3,410,097 | 11/1968 | Young | 61—54 X |

JACOB SHAPIRO, Primary Examiner

U.S. Cl. X.R.

25—118; 61—48, 56.5; 264—32